No. 760,535. PATENTED MAY 24, 1904.
D. C. GROVES & A. R. STANTON.
APPARATUS FOR RAISING SUNKEN VESSELS.
APPLICATION FILED JUNE 1, 1903.
NO MODEL.
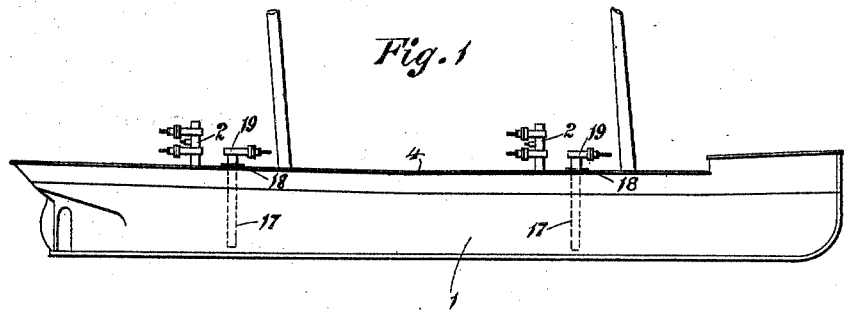
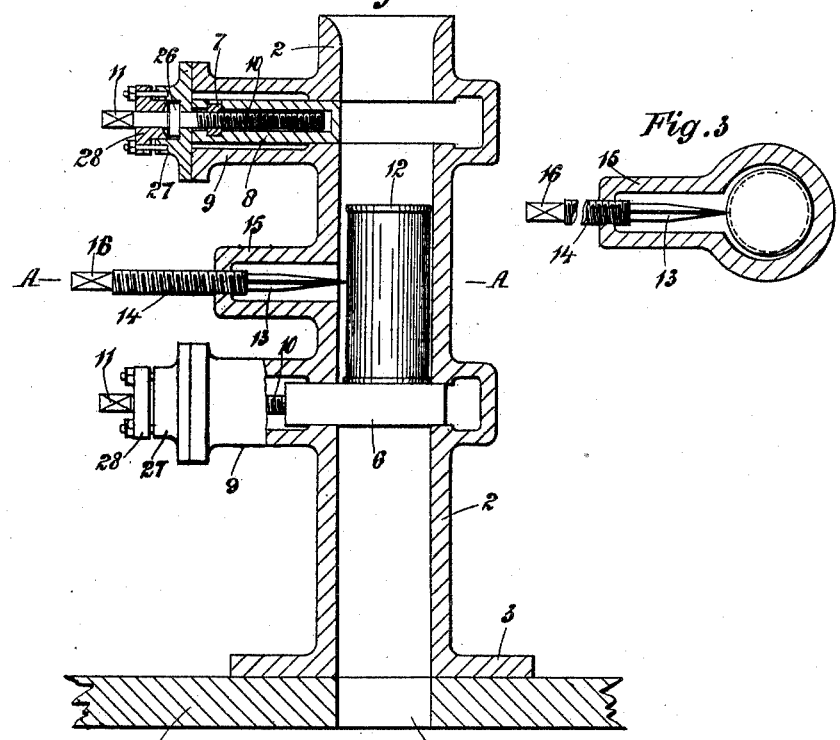
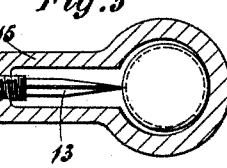
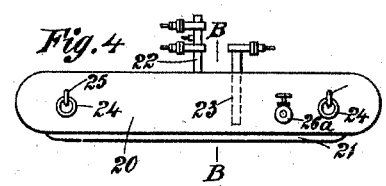
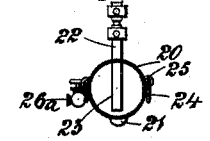
Witnesses:
E. S. Baldwin
A. J. Knox
Inventors —
David Calder Groves
Albert Robert Stanton
By Henry H. Hayward
Attorney No. 760,535. Patented May 24, 1904.

UNITED STATES PATENT OFFICE.

DAVID CALDER GROVES, OF DUNEDIN, AND ALBERT ROBERT STANTON, OF SOUTH DUNEDIN, NEW ZEALAND.

APPARATUS FOR RAISING SUNKEN VESSELS.

SPECIFICATION forming part of Letters Patent No. 760,535, dated May 24, 1904.

Application filed June 1, 1903. Serial No. 159,668. (No model.)

*To all whom it may concern:*

Be it known that we, DAVID CALDER GROVES, of Forbury Road, St. Clair, Dunedin, and ALBERT ROBERT STANTON, of Victoria Terrace, Anderson's Bay Road, South Dunedin, in the Colony of New Zealand, subjects of His Majesty the King of Great Britain and Ireland, have invented an Improved Apparatus for Raising Sunken Vessels and the Like, of which the following is a specification.

The essential feature of this invention is the employment of acetylene gas for displacing the water in sunken vessels.

Calcium carbid is introduced into the submerged vessel and water then allowed access to it, whereby the gas is generated in quantity sufficient to force out the water from the vessel. Holes in the upper part of the vessel are stopped by any suitable means, and if there are holes in the bottom of the vessel the water passes out through them. If there are no holes in the bottom of the vessel or they are stopped by silt or otherwise, then we provide means of escape for the water, preferably through the upper deck. We may also assist the lifting of the vessel by the employment of one or a plurality of water-tight chambers, which may be filled with water to cause them to sink to the side of the vessel, to which they are firmly attached. Calcium carbid is then passed into them for the purpose of generating acetylene gas and expelling water.

Our apparatus comprises a vertical tube having a flange or the like at its lower end, by which it is supported vertically upon the deck of the vessel and over a hole cut therein. Within the tube is a plurality of superposed valves independently operable from outside the tube. When introducing the calcium carbid, the lower valve is closed and the upper valve opened. The carbid is then placed in the tube and the upper valve closed. The lower valve is then opened and the carbid allowed to fall into the vessel. The water escapes through a pipe fixed to the deck and projecting within and near to the bottom of the vessel. When the vessel is too deeply submerged to permit the tube to be extended above the surface of the water, the carbid is placed in sealed receptacles and placed in the tube immediately below a spear or cutter, which can be operated to remove a cover from or to burst the receptacle or to perforate it. The lower valve is then operated to allow the carbid to pass into the vessel.

Our invention is illustrated in the accompanying drawings, wherein—

Figure 1 is a side elevation of a vessel fitted with our apparatus; Fig. 2, a vertical central section of the apparatus drawn to a larger scale; Fig. 3, sectional plan on A A, Fig. 2; Fig. 4, a side elevation of a chamber employed to assist in raising the vessel; Fig. 5, a transverse section on B B, Fig. 4.

The same numerals of reference indicate the same or corresponding parts throughout the figures.

The submerged vessel 1 is prepared for raising operations by sealing all openings in its upper portion and staying all parts which would otherwise be likely to give way under pressure of the gas in expelling the water. In some cases sufficient buoyancy to raise the vessel may be obtained by expelling the water from one or more holds, in which case the holds alone require to be sealed at their upper portions. The vertical tube 2 is bolted through a flange 3 to the deck 4 over an opening 5 therein and is provided with the valves 6 and 8. The valve 6, which is a common type of sluice-valve, slides within the casing 9, within which it is operable to open and close the passage through the tube by a screw 10, which passes through a nut 7, fixed in the valve, extends through the casing, and has a sided end 11 to receive a turning-handle. A collar 26, integral with the screw 10, fits within a recess in the cover 27 of casing 9 and is maintained in position by the gland 28. The valve 8 is similar to valve 6 and is operated in a similar manner.

Apparatus for breaking the sealed receptacle 12, containing the carbid, comprises a spear or cutter 13, fixed to the end of the screw 14, which projects through a screw-threaded box 15 upon the side of the tube and has a sided end 16 to receive a handle, by which the screw is turned to cause the spear to break or pierce the receptacle from side to side, after which it may be withdrawn and the valve 6 opened to permit the receptacle, with the carbid, to fall into the vessel.

The delivery-pipe 17, through which water is discharged, passes through a hole in the deck to which it is secured by bolts through its flange 18 and extends to near the bottom of the vessel. A valve 19, similar to the valves 6 and 8, is secured to the top of the pipe 17 to enable an increased pressure to be obtained within the vessel, if desired, and it may also be closed after the water has been expelled.

The chamber 20, Figs. 4 and 5, is cylindrical in transverse section, has rounded ends, and is fitted with the weighted keel 21 to cause it to maintain a desired position in the water. The chamber is floated to a position above or alongside the sunken vessel, and water is then admitted through the valve $26^a$ to enable it to be sunk to the vessel, to which it is secured. The chamber is fitted with the tube 22, which is similar in all respects to the tube 2 described, and is fitted with similar valves and apparatus for breaking the carbid-receptacle. It is also fitted with the delivery-pipe 23, which is similar to the pipe 17 previously described, and is fitted with a similar valve at its upper end. Rings 24 are carried in brackets 25, riveted to the sides of the chamber, for the purpose of enabling the chamber to be secured to the side or upon the deck of the submerged vessel by chains or the like. When firmly secured, water is expelled from the chamber by passing carbid of calcium into its interior in the manner described.

When the vessel to be raised is a large one a number of vertical tubes may be used, and a number of the chambers such as described may be employed to assist in the flotation.

What we claim as our invention, and desire to secure by Letters Patent, is—

1. Apparatus for the purpose indicated comprising in combination a tube secured to a vessel and communicating with the interior thereof, superposed independently-actuated valves within the tube, and means between the valves for breaking a receptacle for calcium carbid placed within the tube substantially as specified and illustrated.

2. Apparatus for the purpose indicated comprising in combination a tube secured to a vessel and communicating with the interior thereof, superposed independently-actuated valves within the tube, means between the valves for breaking a receptacle for calcium carbid within the tube, and a pipe fixed to the vessel and projecting into the interior thereof for the discharge of water therefrom as specified.

In witness whereof we have hereunto set our hands in presence of two witnesses.

DAVID CALDER GROVES.
ALBERT ROBERT STANTON.

Witnesses:
I. W. JONES,
ALBERT KNOX.